May 16, 1967 P. M. DAVIES 3,320,594
ASSOCIATIVE COMPUTER
Filed March 10, 1964
Fig. 1
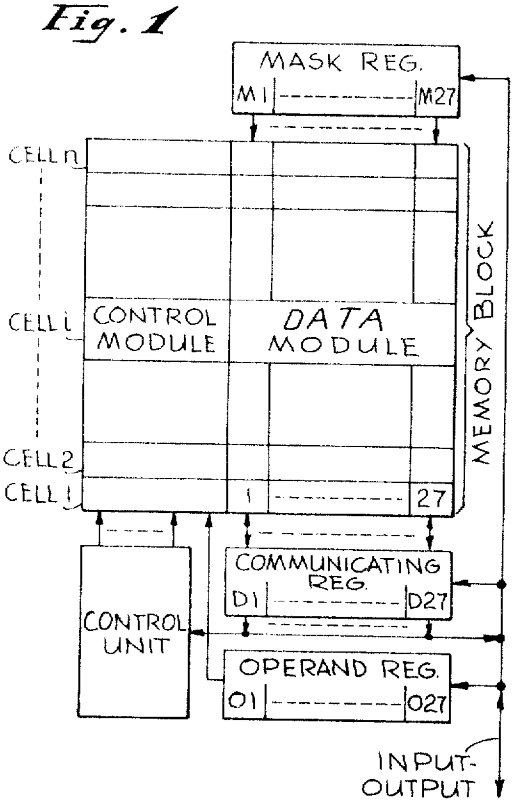
Fig. 2
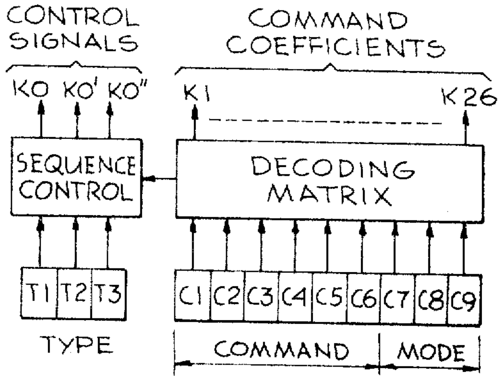
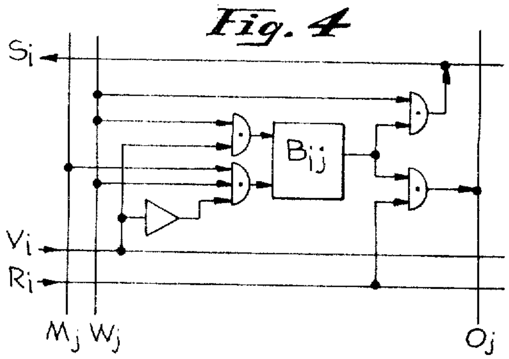
Fig. 3
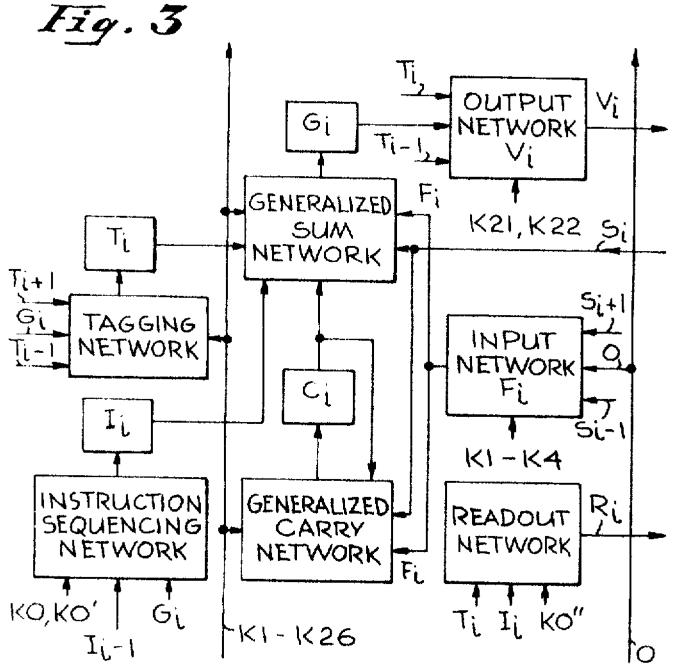
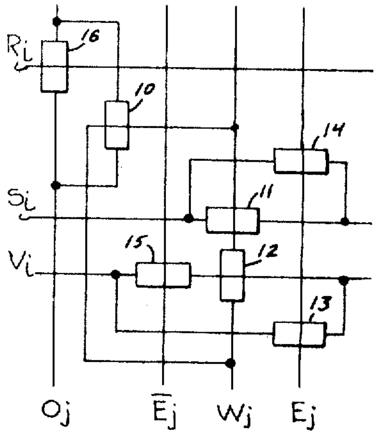
Fig. 5
INVENTOR
PAUL M. DAVIES
BY [signature]
AGENT

United States Patent Office 3,320,594

Patented May 16, 1967

3,320,594

ASSOCIATIVE COMPUTER

Paul M. Davies, Manhattan Beach, Calif., assignor to TRW Inc., a corporation of Ohio Filed Mar. 10, 1964, Ser. No. 350,843

5 Claims. (Cl. 340—172.5)

This invention relates to an associative computer and, more particularly, to an organization for a computer that extends the previously known concepts inherent in associative memory systems to the problems of general computation. In my copending applications entitled, "Self-Searching Memory," Ser. No. 76,368, now abandoned; "Improvement in Self-Searching Memory Systems," Ser. No. 110,098, now Patent No. 3,196,407; "Sequential Retrieval Control for a Self-Searching Memory," Ser. No. 151,326, now Patent No. 3,196,409; "Improved Storage Circuits for a Self-Searching Memory," Ser. No. 177,666, now Patent No. 3,210,739; and others, and also copending application entitled "Associative Memory System," Ser. No. 272,404 by John L. Rogers and Horace T. Mann, owned by the same assignee, there is shown associative memory systems employing distributed logic techniques that allow simple decisions to be made simultaneously throughout the structure.

In the present invention, more complex distributed logic is provided for simultaneously performing complete programs on sets of data that have been identified by associative structures.

The new technologies of thin films and integrated circuitry have broad implications to computer and memory organization. For instance, the increased simplicity, low power consumption and low cost of active devices permit their more extensive use. At the same time, the problem of interconnecting these devices becomes crucial; for, as the system is made smaller and faster, the problems associated with distributed impedance increase. In addition, there are geometrical constraints such as the restriction to a plane and the desirability of a lattice-like structure which must be observed.

The associative memory as illustrated in my copending application is a structure which capitalizes upon the potentials of these technologies while complying with the constraints. This is illustrated by the following characteristics:

(1) the structure of the memory is periodic;

(2) memory and computational functions are combined and distributed throughout the entire memory;

(3) logical operation go on simultaneously in all cells of any selected part of the memory; and (4) records are selected on the basis of content rather than address (although part of the content may be an address).

Perhaps the most crucial characteristic of the associative memory is that it possesses distributed logic which permits simple associations and decisions to be made simultaneously throughout its structure, thus obviating, in some case, the need to search for and withdraw records from the memory one at a time.

Over the past few years studies have also been made of periodic computer structures quite unrelated to the associative memory. The goal here has usually been to spatially relate identical logic modules in an organization capable of performing many computations simultaneously.

This invention is concerned with the concept of combining the principles of the associative memory with the concept of simultaneous computation which employs techniques well known in the art today. The concept of simultaneous computation is achieved by employing a periodically structured computer based upon the associative memory concept for performing any computation on the basis of an internally stored program and performing many such computations simultaneously. It is envisioned that a computer built according to the teachings of this invention would have a computational speed far in excess of presently available computers and, further, that the periodic organization of the associative memory would simplify fabrication and minimize transmission delays. The claimed increase in speed is occasioned by the ability of the associative computer to perform simultaneous computations.

The organization resembles that of the associative memory in that a plurality of memory cells is provided in which each memory cell comprises a control module, a data module, and a tag indicator. The control module comprises means for generating and feeding a tag signal to the tag indicator, in which the tag signal determines the state of the tag indicator and hence establishes what is termed a tagged cell. A writing signal is generated in the control module of each tagged cell and also in the control module of a memory cell immediately adjacent to the tagged cell, each of the data modules having a plurality of positions each individually communicating with corresponding bit positions of an external communicating register. The register is arranged to generate a command signal in each bit position to all memory cells. Each bit position of each data module comprises means responsive to the command signal for generating a nondestruct readout signal indicative of the information stored in said bit position. The nondestruct readout signal in each memory cell is fed to the control module of that cell and also to the control module of an adjacent cell. The nondestruct readout signal generated in an adjacent memory cell is also fed to the control module of the tagged cell. An operand signal generated from an external operand register is fed to the control module of all memory cells for indicating the informational content of said bit. For convenience, the nondestruct readout signals fed to the control module and the external operand signals are called informational input signals. Means in each bit position of the data module of each cell is responsive to a generated writing signal from the control module of that cell and said command signal in that bit position for storing the information contained in the writing signal.

The individual cells are identified by comparing the key portion of the operand register simultaneously with the key portion of the stored data in each memory cell to thereby select the desired memory cell.

Cells satisfying the association are tagged and thus selected for further computation.

The control module in each cell contains logic to permit simple logical and arithmetic operations to be performed on an operand stored in the cell and, in the case of binary operations (two operands), on a second operand stored in an adjacent cell or in an external register.

The sequence of tagging and computing operations performed is controlled by an internally stored program, which itself is withdrawn from the computer, one instruction at a time, by the associating mechanism.

These instructions exert control over the individual cells in which computation is to proceed by means of command coefficients derived from the instruction and transmitted to the control module of each cell.

These control modules each contain certain generalized logic networks whose function is specified in each case by the values of the coefficients received.

The logic performs the specified operations, bit serially, in all tagged cells at once, using the operands specified by certain of the command coefficients.

Further objects and advantages of this invention will be made more apparent by referring now to the accompanying drawings wherein:

FIGURE 1 is a block diagram of an associative computer;

FIGURE 2 illustrates the control unit which supervises the execution of sequential instructions and the acquisition of masks, keys and operands from memory;

FIGURE 3 illustrates a preferred embodiment of a control module;

FIGURE 4 is a diagram of a typical data bit of the memory module; and

FIGURE 5 illustrates a second embodiment of a data bit position.

Referring now to FIGURE 1, there is shown a block diagram of an associative computer consisting of a memory block, three registers, M, D and O and a control unit. The memory block consists of *n* identical cells, each made up of a control module and a data module.

M1–M27 is a mask register which defines the portion of the word in which the association or computation is to be performed. D1–D27 is a communicating register which communicates with the memory cells in reading, tagging (i.e. associating) and computing operations. The M and D registers communicate with the cells of the memory by means of bit lines. Instructions, masks, keys, and operands are read from the memory block into the D register a word at a time in parallel. Instructions are then routed to the control unit, masks to the M register and keys and operands to the O register.

In the performance of any instruction involving a key or an operand, the M register specifies the field of the word to be operated upon. Signals are transmitted along sequential bit lines of the field to all cells. At the same time, sequential bits in the selected field of the O register are transmitted to all control modules. In tagging operations, these bits from O register are associated with the corresponding bits from the memory modules in all cells of the computer. In one mode of all other binary operations, the bits from the O register enter into the operations performed in the control modules of tagged cells. The second operand comes from the tagged cells themselves. In other modes, the first operand may come from an adjacent cell in memory instead of the O register. The instruction determines the mode. In input operations, the input word enters the O register serially. It is then transmitted serially to tagged control modules and stored in the associated memory modules. In output operations, words are read in parallel from the memory to the D register; then, they are shifted out serially.

Referring now to FIGURE 2, there is shown a control unit for supervising the execution of sequential instructions and the acquisition of masks, keys and operands from memory. In executing an instruction, it decodes the command and mode portions of the instruction, producing command coefficients K1–K26 and control signals K0–K0″ which are transmitted to all control modules.

A unique characteristic of the associative computer is the manner in which these command coefficients are used in the control modules to perform the desired operation.

Referring now to FIGURE 3, there is shown a block diagram of a typical control module which communicates with the associative memory module by means of three word lines: $V_i$, $S_i$, and $R_i$. $V_i$ is used to sequentially write 1's and 0's into selected bits of the *i*th memory module. $S_i$ is used to sequentially transfer selected bits of the *i*th memory module to the control module where they are being operated upon according to the instruction being performed. $R_i$ is a control line which is used to cause the contents of the *i*th cell to be read out in parallel to the D register.

The control module communicates with adjacent cells by means of $S_{i-1}$, $I_{i-1}$, and $T_{i-1}$ from the cell below and by means of $S_{i+1}$ from the cell above. These lines permit binary operations to be performed upon operands from two adjacent cells and also transfer program command from one cell to the next. This will be explained below.

Finally, the control module receives the command coefficients, K1–K26 from the control unit and O from the O register. The latter brings sequential bits of the O register to every control module.

The control module has two basic tasks. First, when flip-flop, $I_i$, is one, indicating that command resides in the *i*th cell, it turns on $R_i$, causing the contents of cell *i* to be read out to the D register. It then transfers command to cell $i+1$ by turning on $I_{i+1}$ and turning off $I_i$. K0, from the control module initiates this operation by which instructions, masks, keys and certain operands, which together constitute the program, are read from memory.

The second task is to perform any of the instructions specified by the command coefficients, K1–K26. This is done by five logical networks, $F_i$, $G_i$, $C_i$ and $V_i$ and $T_i$. $F_i$ is an input network which selects the first operand from among $S_{i-1}$, O and $S_{i+1}$. $G_i$ is a generalized sum network which bears a certain resemblance to the network which derives a binary sum from two serially presented operands and a carry input. $C_i$ is a generalized carry network which bears a similar resemblance to the binary carry logic. $V_i$ is an output network which causes the output of $G_i$ to be written into cell *i* under certain circumstances provided the *i*th cell is tagged, i.e., tag flip-flop $T_i=1$. (In some cases $V_i$ is controlled by $T_{i-1}$.) $T_i$ is the network which controls the setting and resetting of the tag flip-flop.

The logic networks shown in FIGURE 3, and which have the properties given by the equations given above, can be constructed by using circuit and logic techniques known to those skilled in the art.

The Boolean equations for these networks are as follows:

$$F_i=OK1+K2T_iS_{i+1}+K3T_{i+1}S_{i+1}+K4T_iS_{i-1}$$

$$G_i=K5\overline{S}_i\overline{F}_i\overline{C}_i+K6\overline{S}_i\overline{F}_iC_i+K7\overline{S}_iF_i\overline{C}_i+K8\overline{S}_iF_iC_i+K9S_i\overline{F}_i\overline{C}_i+K10S_i\overline{F}_iC_i+K11S_iF_i\overline{C}_i+K12S_iF_iC_i$$

$$c_i=K13\overline{S}_i\overline{F}_i+K14\overline{S}_iF_i+K15S_i\overline{F}_i+K16S_iF_i$$

$$c_i'=K17\overline{S}_i\overline{F}_i+K18\overline{S}_iF_i+K19S_i\overline{F}_i+K20S_iF_i$$

$$V_i=K21T_iG_i+K22T_{i+1}G_i$$

$$t_i=K23G_i+K24T_{i-1}+K25T_{i+1}$$

$$t_i'=K26+K24\overline{T}_{i+1}+K25\overline{T}_{i+1}$$

where $c_i$ and $c_i'$ represent the set and reset conditions respectively for $C_i$ and $t_i$ and $t_i'$ represent the set and reset conditions $T_i$. $G_i$ and $C_i$ derive their names from the fact that they reduce to the binary sum and carry equations by setting K6, K7, K9, K12, K16 and K17 to "1" and all other K's to 0.

A very broad class of functions can be obtained from these formulas, as will be shown below, by selecting appropriate values for the K coefficients. In this sense, the associative computer may be micro-programed. After a specific set of functions has been selected, a number of the coefficients may turn out to be unused, in which case they may be profitably dropped, thereby simplifying the networks. In the present discussion, we shall assume that all are retained.

Referring now to FIGURE 4, there is shown a logic diagram of a typical data bit of the memory module consisting of the bit storage element itself, $B_{ij}$, and control gates which relate it to bit lines $W_j$ and $O_j$ and to word lines $V_i$, $S_i$ and $R_i$.

To write into memory, one bit of all words is selected by means of line $W_j$. The bit to be written is then transmitted along $V_i$. It may originate in the O register or it may be generated by $G_i$ and $C_i$ as the result of a computation. A mechanism associated with the M register generates the $W_j$ signals in sequence throughout the field specified by the mask.

To perform most instructions, including tagging instructions, the $W_j$ lines are used to select the outputs of successive bit elements in every cell. The outputs of the $W_j.B_{ij}$ gates are effectively logically summed over $j$, although in particular mechanizations no OR gate as such may exist. The resulting signal $S_i$, is transmitted to the control module where it enters the computation performed by the $G_i$ and $C_i$ networks.

To read a word in parallel from memory to the D register as in the acquisition of instructions, masks, keys and operands, the control module of the appropriate cell pulses $R_i$ causing the $B_{ij}$ elements to be read out on the $O_j$ lines.

In this section, the various types of data stored in the computer will be described and the sequence of operation required to perform a program will be outlined.

tion would identify a class of data, the second portion would be reserved for use by sub-routines. In this way, a sub-routine may be used with arbitrary sets of data. The operand portion of the data word is a conventional binary number with sign in bit position 16. Whenever an operand is read from memory, it is transferred to the O register.

(123)=010 identifies an instruction. Instructions consist of a label and a command. The label identifies the first instruction of a routine. A transfer instruction transfers command to this point by associating on the label and turning on the $I_i$ flip-flop. Then, the computer steps along automatically from this point by turning off $I_i$ and turning on $I_{i+1}$ until another transfer instruction is reached. The command is conventional. Instructions remain in the D register. The outputs of the command portion of the D register are decoded by the control unit to produce the command coefficients.

(123)=011 identifies a mask. The mask is transferred to the M register where it selects data fields for association or computation. A mask bit equal to 1 means that the corresponding bit position is to be operated upon. Note that (23)=11 so that the type designation is always a criterion of association.

(1)=1 identifies a key. Keys are very similar to date words in that they are transferred to the O register and then, during the performance of an instruction, to the control modules. Keys are in fact the operands used in tagging instructions. The principal distinction of the key is that any of its bits from 2 to 27 may assume any value. The key in conjunction with the mask thus provides considerable freedom in the selection of a class of words. In use, bit 1 is transmitted to the control modules as a zero; bits 2 and 3 may assume any value, so that words of any type except keys may be tagged by association.

A typical program will consist of a sequence of masks, keys, instructions and data words stored in sequential cells of the computer. Control will advance from one of

TABLE I.—WORD TYPE FORMATS

| Type | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| 1. empty | 0 | 0 | 0 | X | X | X | X | X | X | X | X | X | X | X | X | X | X | X | X | X | X | X | X | X | X | X | X |
| 2. data word | 0 | 0 | 1 | | | | | | | label | | | | | | ± | | | | | | operand | | | | | |
| 3. instruction | 0 | 1 | 0 | | | | | | | label | | | | | | | | | | | | command | | | | mode | |
| 4. mask | 0 | 1 | 1 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 |
| 5. key | 1 | X | X | X | X | X | X | X | X | X | X | X | X | X | X | X | X | X | X | X | X | X | X | X | X | X | X |

Referring now to Table I, there is shown, for illustration purposes only, an organization of five types of words. Each word is 27 bits long, and the first three bits identify the type. (123)=000 indicates that the cell is empty, in which case, the other bits may contain anything. Empty words are not in use and, hence are available for any use.

(123)=001 indicates a data word. A data word consists of a label and an operand. The label is used to identify an operand or a class of operands. Thus, if the same rountine were to be performed on $n$ sets of data, each consisting of, say, three words, $A_i$, $B_i$ and $C_i$, all the $A_i$'s could be identified by the same label; then, a tagging instruction could be used to tag all the $A_i$'s by an equality check on the label field. In practice, the label may be divided into two or more portions. The first porthese cells to the next by means of the $I_i$ flip-flops. When a particular $I_i$ is on, control pulses from the control module caus the $i$th cell to be read out to the D register. The type of the word is then determined by an examination of bits 1, 2 and 3, and the appropriate action is taken. If the word is a mask, a key or a data word, the word is transferred to the M or O register. If it is an instruction, the instruction is performed. This may involve the use of the mask to select sequential bits of the field of each word in memory as well as of the O register. It may involve the sequential transmission of the selected field of the O register to the control modules. And, it will involve the transmission of command coefficients and control signals from the control unit to the control modules as well as to other parts of the machine.

TABLE II.—THE COMMAND LIST

| No. | Symbol | Name | Meaning |
|---|---|---|---|
| 1 | TEI | I-tag on equal | Turn off tags where keys mismatch. |
| 2 | TEU | U-tag on equal | Turn on tags where keys match. |
| 3 | TUI | I-tag on unequal | Turn off tags where keys match. |
| 4 | TUU | U-tag on unequal | Turn on tags where keys mismatch. |
| 5 | TGI | I-tag on greater | Turn off tags where stored key is not greater. |
| 6 | TGU | U-tag on greater | Turn on tags where stored key is greater. |
| 7 | TLI | I-tag on less | Turn off tags where stored key is not less. |
| 8 | TLU | U-tag on less | Turn on tags where stored key is less. |
| 9 | TRA | Transfer unconditionally | Transfer to (4-15). |
| 10 | TRE | Transfer on equal | Transfer to (4-15) if keys match. |
| 11 | TRU | Transfer on unequal | Transfer to (4-15) if keys mismatch. |
| 12 | SHL | Shift left | Shift tagged words left one bit. |
| 13 | SHR | Shift right | Shift tagged words right one bit. |
| 14 | SEL | Shift end around left | End around shift left one bit. |
| 15 | SER | Shift end around right | End around shift right one bit. |
| 16 | SHD | Shift down | Shift tagged word down one word. |
| 17 | SHU | Shift up | Shift tagged word up one word. |
| 18 | INT | Interchange | Interchange tagged word and neighbor. |
| 19 | STD | Shift tag down | Shift tag down one word. |
| 20 | STU | Shift tag up | Shift tag up one word. |
| 21 | ADD | Add | Add $S_i$ (tagged) to $F_i$, result to $V_i$. |
| 22 | ADO | Add one | Add 1 to $S_i$ (tagged), result to $V_i$. |
| 23 | SUB | Subtract | Subtract $S_i$ (tagged) from $F_i$, result to $V_i$. |
| 24 | SBO | Subtract one | Subtract 1 from $S_i$ (tagged), result to $V_i$. |
| 25 | RSB | Reverse, subtract | Subtract $F_i$ from $S_i$ (tagged), result $V_i$. |
| 26 | LPR | Logical product | Log. prod. of $S_i$ (tagged) and $F_i$, result $V_i$. |
| 27 | LSM | Logical sum | Log. sum of $S_i$ (tagged) and $F_i$, result to $V_i$. |
| 28 | CLR | Clear | Clear (123) of $S_i$ (tagged). |
| 29 | CLT | Clear tags | Turn off all tag flip-flops. |
| 30 | INP | Input | Input one word to tagged cell. |
| 31 | OUT | Output | Output one word from tagged cell. |

Referring now to Table II, there is shown a list of typical instructions which have been microprogrammed for the associative computer by selecting appropriate values for the command coefficients. Eight tagging or associating instructions are listed. These are of two types, I and U, which stand for intersection and union associations respectively. In the I type, the tag flip-flop is turned off wherever the association between the transmitted field (from the O register) and the stored field fails. Successive applications of I associations produce intersection sets. In the U type, the tag flip-flop is turned on wherever the association between the transmitted and stored fields suceeds. Successive applications of U associations produce union sets. By means of a series of tagging instructions, an extremely complex set of records may be identified. For instance, if the memory contains a set of coordinate triplets, X, Y, Z, describing points in space, the computer could select all those points such that $X>X_0$ or $X_1<X<X_2$ and $Y<Y_0$ and $Z=Z_1$.

In addition to the tagging instructions shown, others have been microprogramed including two that find the maximum and minimum values of a specified field respectively. These instructions involve certain logical operations not required by the other instructions and so have not been included in the command list. Specifically, the search for a maximum would proceed as follows:

First, all cells to be tested would be tagged. Next, the most significant bit positions would be selected by the M register and that bit read from all tagged cells simultaneously. If at least one such bit contained a one, a one would be read out. This one would then be sent to all control modules for comparison with the corresponding stored bit. Wherever a mismatch occurred, the tag would be reset. The process would then be repeated for each bit of the field proceeding to the least significant one. At any bit position where a zero was read out, no comparison would be performed. Finally, only the cells containing the maximum would be tagged, and the D register would contain the maximum. The procedure for tagging the minimum is analogous.

Instructions 9 through 11 transfer command to a different routine. It will be recalled that the first instruction of any routine is identified by a characteristic label. The label of the transfer command is set to the same value. An equality comparison between the two labels causes the $I_1$ flip-flop to be turned on. In the case of TRE and TRU, the transfer is predicated upon a satisfactory association between the stored and transmitted keys.

Instructions 12 through 15 are conventional shift commands which apply of course only to the tagged cells. SHD shifts the selected field of the tagged words down one cell and SHU shifts them up one cell.

INT causes an interchange of the selected fields of all tagged words with their neighbors below. This is a crucial command because it permits non-adjacent words to be brought together. Consider, for instance, a circumstance in which it is desired to perform the same program on a number of sets of data as in a payroll problem. Suppose that each set of data consists of ten words and that it is required to add the second word to the sixth in each set. This would be accomplished by three INT instructions followed by an ADD.

In STD and STU, the tags instead of the data are shifted down or up. This permits a tagging operating to be performed on one word of a set and the tag to be transferred to another.

Instructions 21 through 27 are more or less conventional arithmetic and logical operations. RSB permits an exchange in the selection of minuend and subtrahend.

CLR clears bits 1–3 of all tagged words making the words empty and hence available for new data or programs. CLT clears all tags in memory.

INP causes a word to be read in, transferred via the O-line to all cells and stored in the tagged cells. OUT causes a word to be read from a tagged cell to the D register and then to be shifted out serially.

All of these instructions and many more can be microprogramed using the generalized logic networks described above. In addition, several modes of many of these instructions are available. For instance, in the arithmetic and logical operations involving two operands, one operand comes from the tagged cell; the second may come from the cell above, the cell below or the O-register depending upon the mode. In operations which produce a result, this result may be placed in the tagged cell or the cell below.

TABLE III.—MULTIPLY ROUTINE

| Cell | Type | Label | Operand or Command | Comments |
|---|---|---|---|---|
| | 1 2 3 | 4 5 6 7 8 9 10 11 12 13 14 15 | 16 17 18 19 20 21 22 23 24 25 26 27 | |
| 1 | 0 0 1 | 0 0 1 | $A_i$ | $A_i$: multiplier |
| 2 | 0 0 1 | 0 1 0 | $B_i$ | $B_i$: multiplicand |
| 3 | 0 0 1 | 0 1 1 | $C_i$ | $C_i$: product |
| 4 | 0 1 0 | 0 0 1 | CLT | Clear tags |
| 5 | 0 1 1 | 1 1 1 | 0 0 0 0 0 0 0 0 0 0 0 1 | Mask for $A_i$ digit |
| 6 | 1 0 1 | 0 0 1 | 1 1 1 1 1 1 1 1 1 1 1 1 | Key for $A_i$'s |
| 7 | 0 1 0 | | TEU | U-tag $A_i$'s |
| 8 | 0 1 0 | | STD | Shift tags down |
| 9 | 0 1 1 | | 1 1 1 1 1 1 1 1 1 1 1 1 | Mask |
| 10 | 0 1 0 | | ADD $m=2$ | $B_i+C_i \rightarrow C_i$ |
| 11 | 0 1 0 | | CLT | Clear tags |
| 12 | 0 1 1 | 1 1 1 | | Mask |
| 13 | 1 0 1 | 0 0 1 | | Key for $A_i$'s |
| 14 | 0 1 0 | | TEU | U-tag $A_i$'s |
| 15 | 1 0 1 | 0 1 1 | | Key for $C_i$'s |
| 16 | 0 1 0 | | TEU | U-tag $C_i$'s |
| 17 | 0 1 0 | | SHR | Right shift A's and C's |
| 18 | 0 1 0 | | CLT | Clear tags |
| 19 | 0 1 1 | 1 1 1 | | Mask |
| 20 | 1 0 1 | 1 0 0 | | Key for D |
| 21 | 0 1 0 | | ADO | Add 1 to D |
| 22 | 0 1 1 | | 1 1 1 1 1 1 1 1 1 1 1 1 | Mask |
| 23 | 0 1 0 | 0 0 1 | TRU | If D-E, transfer to 4 |
| 24 | 0 1 0 | | CLR | Clear D |
| 25 | 0 0 1 | 1 0 1 | 0 0 0 0 0 0 0 0 1 1 0 0 | E=12 |

Referring now to Table III, there is illustrated a program that performs the binary multiplicate of pairs of numbers, $A_i$ and $B_i$, placing the result in $C_i$. For each bit of the multiplier $A_i$ which is equal to one, $B_i$ is added to $C_i$; then, $A_i$ and $C_i$ are shifted right. After twelve cycles through this loop, the upper half products appear in the $C_i$'s. D and E in cells 25 and 26 are used to count the twelve iterations. The routine is entered at cell 4 and exited at cell 24. Bits 13–15 of the label identify and distinguish $A_i$, $B_i$ $C_i$, D and E for purposes of this subroutine. The remaining bits of the label, 4–12, are available to identify the operands by independent categories. Thus, to apply the multiply routine to various sets of data, 13–15 will be left empty. A set of data identified by bits 4–12 will be tagged and appropriate labels written into bits 13–15. The multiply routine can then be applied.

There are a number of possible variations of the associative computer both in terms of the logical organization and the mechanization. In selecting the model which has been described, we have attempted to choose the simpler and perhaps less sophisticated alternative. For instance, all computation has been performed parallel by word, serially by bit. There are a few operations such as TEI, TEU and INP which can be done parallel by bit.

Referring now to FIGURE 5, there is shown a second implementation of the data bit module implemented by cryogenic techniques. In this implementation key information transmitted from the communicating register is simultaneously compared in the data portion of all memory cells. In the presence of a comparison in any given memory cell, a match indicating signal is generated and fed to the control module of that memory cell. For any given bit position, the information is transmitted along line $W_j$ to all memory cells. The bit position contains the stored information as a circulating current in the path comprising the control element of device 10, line $W_j$, the control element of device 11, the gate element of device 12, line $W_j$, and back to the control element of device 10. The path just defined is commonly known as a persistor current path, well known in the art, and more fully described and claimed in the cited copending applications. In the presence of an interrogating comparing signal on ine $W_j$ and depending upon the information being transmitted on line $W_j$ and that stored in the persistent current loop, the gate element of device 11 will become resistive in the presence of a mismatch. The converse is also true in that the gate element of device 11 will remain superconductive in the presence of a match between the stored information and the transmitted key information. In the normal operation, line $E_j$ is impulsed to thereby cause the gate element of device 13 and the gate element of device 14 to become resistive.

Considering now those bit positions not receiving an enabling pulse on line $E_j$, it will be observed that element 14 will remain superconducting thereby by-passing the gate element 11. A match indicating signal will appear on line $S_i$ for any given memory cell in the presence of the gate elements on line $S_i$ providing a superconductive path. This implies that a match condition must exist for those bit positions that are interrogated resulting in the gate of element 11 being superconductive and that the gate element 14 be superconductive for those bit positions not being interrogated. Should either of these conditions not be present, a resistive element will appear on line $S_i$ and no match indicating signal will be generated from that memory cell and a signal indicating that no match occurs will be generated on corresponding $\overline{S_i}$ line for that memory cell (not illustrated). This system is to be compared with that illustrated in FIGURE 4, in which FIGURE 5 generates a match indicating signal indicative of a complete match of the transmitted key information with the stored information. In FIGURE 4, individual nondestruct bit position readout signals were generated and individually transmitted to the control module one bit at a time, thereby providing the control module with the information content with the individual bit position. The system of FIGURE 5 can produce the same output information as that of FIGURE 4 by transmitting a binary one on line $W_j$ for a single bit position while simultaneously masking all other bit positions. If the stored information is also a binary one, the output on line $S_i$ will indicate the informational content of the stored bit as a one, whereas an output $\overline{S_i}$ will indicate this informational content as a binary 0.

For the writing operation, a command signal from the control module is generated on the $V_i$ line and an enabling signal generated on either $E_j$ or $\overline{E_j}$ is generated from the mask register depending upon whether information is to be written or not written in that bit position. Having established these conditions prior to writing the information signal to be written is transmitted on line $W_j$. If information is not to be written into the selected bit position, the enabling pulse on line $E_j$ will cause the gate of element 15 to become resistive thereby by-passing the command writing signal on the $V_i$ line through the gate of element 13. If information is to be stored line $E_j$ will be energized thereby causing the gates of elements 13 and 14 to become resisitive. With element 13 resistive the writing command signal on the $V_i$ line is caused to flow through the gate of element 15 and the control of element 12, thereby causing the gate of element 12 to become resistive. The informational signal on line $W_j$ arrives in the proper time sequence to find element 12 resistive and hence is written in the persistor loop circuit in a well known manner. With this implementation, it is now possible to selectively control individual bit positions and the writing of information into these selected bit positions. Readout is accomplished by generating a signal on the $R_i$ line causing element 16 to become resistive and based upon the established convention of causing element 10 to become resistive in the presence of a stored binary one, the resistivity of line $O_j$ will indicate a binary one, whereas a superconductive $O_j$ line will indicate a stored binary 0.

A ladder circuit for selecting the first of a set of tagged cells is described and claimed in my copending application Serial No. 76,182, entitled "Memory Cell Selecting Means," filed Dec. 16, 1960. Circuits of this type could be combined with the present invention for selecting the first tagged cell.

A second form of the ladder network has been investigated which requires two tag flip-flops per control module. If we call these $T_i$ and $U_i$ respectively, the ladder network relates the cells in pairs such that the first member of each pair has $T_i=1$ and the second member has $U_i=1$. This may be accomplished by transferring current from the left rail to the right rail each time $T_i=1$ and from the right rail to the left rail whenever $U_i=1$. Current in the rungs is then used to establish the pairing. The same ladder network may be used to transmit information from the $T_i$ cells to the associated $U_i$ cells. This mechanism makes possible the performance of binary operations on noncontiguous operands and obviates the need for the interchange command.

This completes the description of the embodiments of the invention disclosed and illustrated herein. However, many modifications and advantages will be apparent to persons skilled in the art without departing from the spirit and scope of this invention.

The embodiments of the invention in which an exclusive property or privilege is claimed are defined as follows:

1. A plurality of memory cells,
each memory cell comprising a control module, a data module and a tag indicator,
said control module comprising means for generating and feeding a tag signal to said tag indicator,
said tag signal determining the state of said tag indicator whereby a memory cell having the tag indicator in a predetermined state being termed a tagged cell,
means in the control module of said tagged cell generating a writing signal,
means in the control module of an immediately adjacent memory cell for generating a writing signal,
means in every data module for generating a match indicating signal for determining the existence of a match between stored information in said cell and information from a communicating register,
means for feeding the match indicating signal generated in the data module of each memory cell to the control module of that cell,
means for feeding the match indicating signal generated in the data module of said tagged memory cell to the control module of an adjacent cell,
means for feeding the match indicating signal generated in the data module of said adjacent memory cell to the control module of said tagged cell,
means for generating an external operand signal from an operand register from any one bit position to the control modules of all memory cells for indicating the informational content of said bit,
said match indicating signals fed to a control module and said external operand signal being termed information input signals,
logic generating means in each control module responsive to an external function generator control unit for computing the value of at least two logical functions of said informational input signals,
a first computed value being used to control the means for generating said tag signal,
a second computed value being used to control the means for generating said writing signal.
said external function generator transmitting the same plurality of control coefficient signals to the logic generating means in each cell for generating identical logical functions,
the computed value of each logical function being independently determined by said informational input signals.

2. A plurality of memory cells,
each memory cell comprising a control module, a data module and a tag indicator,
said control module comprising means for generating and feeding a tag signal to said tag indicator,
said tag signal determining the state of said tag indicator whereby a memory cell having the tag indicator in a predetermined state being termed a tagged cell,
means in the control module of said tagged cell for generating a writing signal,
means in the control module of an immediately adjacent memory cell for generating a writing signal,
means in every data module for generating a match indicating signal, said match indicating signal indicating the existence of a match between stored information in each of said cells and information transmitted to all cells from a communicating register,
means for feeding the match indicating signal generated in the data module of each memory cell to the control module of that cell,
means for feeding the match indicating signal generated in the data module of said tagged memory cell to the control module of an adjacent cell,
means for feeding the match indicating signal generated in the data module of said adjacent memory cell to the control module of said tagged cell,
means for generating and feeding an external operand signal from an operand register from any one bit position to the control modules of all memory cells for indicating the information content of said bit,
said match indicating signals fed to a control module and said external operand signal all being termed informational input signals,
logic means in each control module responsive to an external function generator for computing the value of at least two logical functions of said informational input signals,
a first computed value being used to control the means for generating said tag signal.
a second computed value being used to control the means for generating said writing signal,
said external function generator transmitting a plurality of control coefficient signals to the logic means in each cell for generating identical logical functions whereby,
the computed value of each logical function is independently determined by said informational input signals, and
means in each bit position of said communicating register for transmitting a signal having an informational portion and a control portion to all memory cells,
each bit position of each data module having means responsive to said control portion and a writing signal from the associated control module for storing the informational portion of said signal.

3. A plurality of memory cells, each memory cell comprising a control module, and a data module, writing means in the control module of each cell for generating a writing signal, means in every data module for generating a match indicating signal for determining the existence of a match between stored information in said cell and information from a communicating register, means for feeding the match indicating signal generated in the data module of each memory cell to the control module of that cell, means for feeding the match indicating signal generated in the data module to the control module of an adjacent cell, means within each control module responsive to match indicating signals fed to that control module for controlling said writing means, each of said data module comprising a plurality of bit positions each individually communicating with a corresponding bit position of said communicating register, and means in each bit position of said communicating register for transmitting a signal saving an informational portion and a control portion to all memory cells, each bit position of each data module having means responsive to said control portion and a writing signal from the associated control module for storing the informational portion of said signal.

4. A plurality of memory cells, each memory cell comprising a control module and a data module, said control module containing a tag indicator, said control module comprising means for determining the state of said tag indicator whereby a memory cell having the tag indicator in a predetermined state being termed a tagged cell, writing means in the control module of each cell for generating a writing signal, means in the control module of an immediately adjacent memory cell for generating a writing signal, each of said data modules comprising a plurality of bit positions each individually communicating with corresponding bit positions of a communicating register, means in each bit position of said communicating register for transmitting a command signal to all memory cells, each bit position of each data module having means responsive to said command signal for generating a nondestruct readout signal indicative of the information stored in said bit position, means for feeding the nondestruct readout signal generated in the data module of each memory cell to the control module of that cell, means for feeding the nondestruct readout signal generated in the data module to the control module of an adjacent cell, means for feeding the nondestruct readout generated in the data module of said adjacent memory cell to the control module of said tagged cell, means for generating an external operand signal from an operand register from any one bit position to the control modules of all memory cells for indicating the informational content of said bit, said nondestruct readout signals fed to a control module and said external operand signal being termed information input signals, logic generating means in each control module responsive to an external function generator for computing the value of at least two logical functions of said informational input signals, a first computed value being used to control the means used to determine the state of said tag indicator, a second computed value being used to control the means for generating said writing signal, and said external function generator transmitting the same plurality of control coefficient signals to the logic generating means in each cell for generating identical logical functions, the computed value of each logical function being independently determined by said informational input signals.

5. A plurality of memory cells, each memory cell comprising a control module and a data module, said control module containing a tag indicator, said control module comprising means for determining the state of said tag indicator whereby a memory cell having the tag indicator in a predetermined state being termed a tagged cell, writing means in the control module of each cell for generating a writing signal, means in the control module of an immediately adjacent memory cell for generating a writing signal, each of said data module comprising a plurality of bit positions each individually communicating with corresponding bit positions of a communicating register, means in each bit position of said communicating register for transmitting a command signal to all memory cells, each bit position of each data module having means responsive to said command signal for generating a nondestruct readout signal indicative of the information stored in said bit position, means for feeding the nondestruct readout signal generated in the data module of each memory cell to the control module of that cell, means for feeding the nondestruct readout signal generated in the data module to the control module of an adjacent cell, means for feeding the nondestruct readout signal generated in the data module of said adjacent memory cell to the control module of said tagged cell, means for generating an external operand signal from an operand register from any one bit position to the control modules of all memory cells for indicating the informational content of said bit, said nondestruct readout signals fed to a control module and said external operand signal being termed information input signals, logic generating means in each control module responsive to an external function generator for computing the value of at least two logical functions of said informational input signals, a first computed value being used to control the means used to determine the state of said tag indicator, a second computed value being used to control the means for generating said writing signal, and said external function generator transmitting the same plurality of control coefficient signals to the logic generating means in each cell for generating identical logical functions, the computed value of each logical function being independently determined by said informational input signals, and means in each bit position of the data module of each cell responsive to a generated writing signal from the control module of that cell and said command signal in that bit position for storing the information contained in said writing signal.

References Cited by the Examiner

UNITED STATES PATENTS

| | | | |
|---|---|---|---|
| 3,230,512 | 1/1966 | Seeber et al. | 340—172.5 |
| 3,243,786 | 3/1966 | Davies | 340—172.5 |

ROBERT C. BAILEY, *Primary Examiner.*

O. E. TODD, Jr., *Assistant Examiner.*